May 9, 1967   J. E. PANZA ETAL   3,318,552
PNEUMATIC CARRIER
Filed Feb. 28, 1966
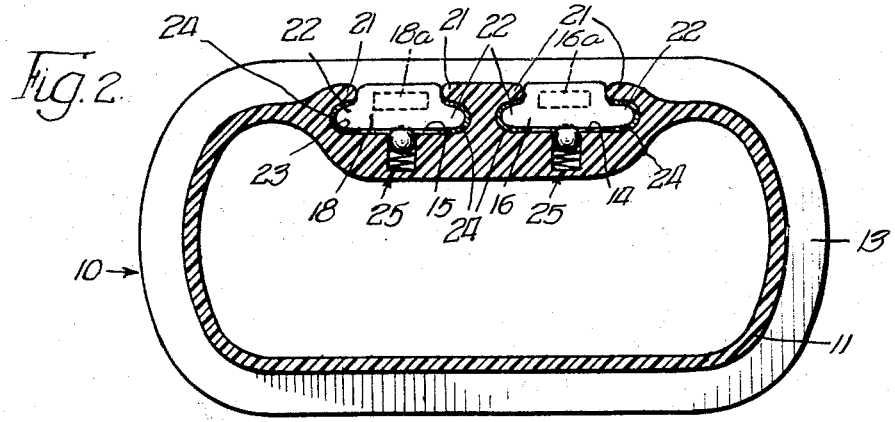
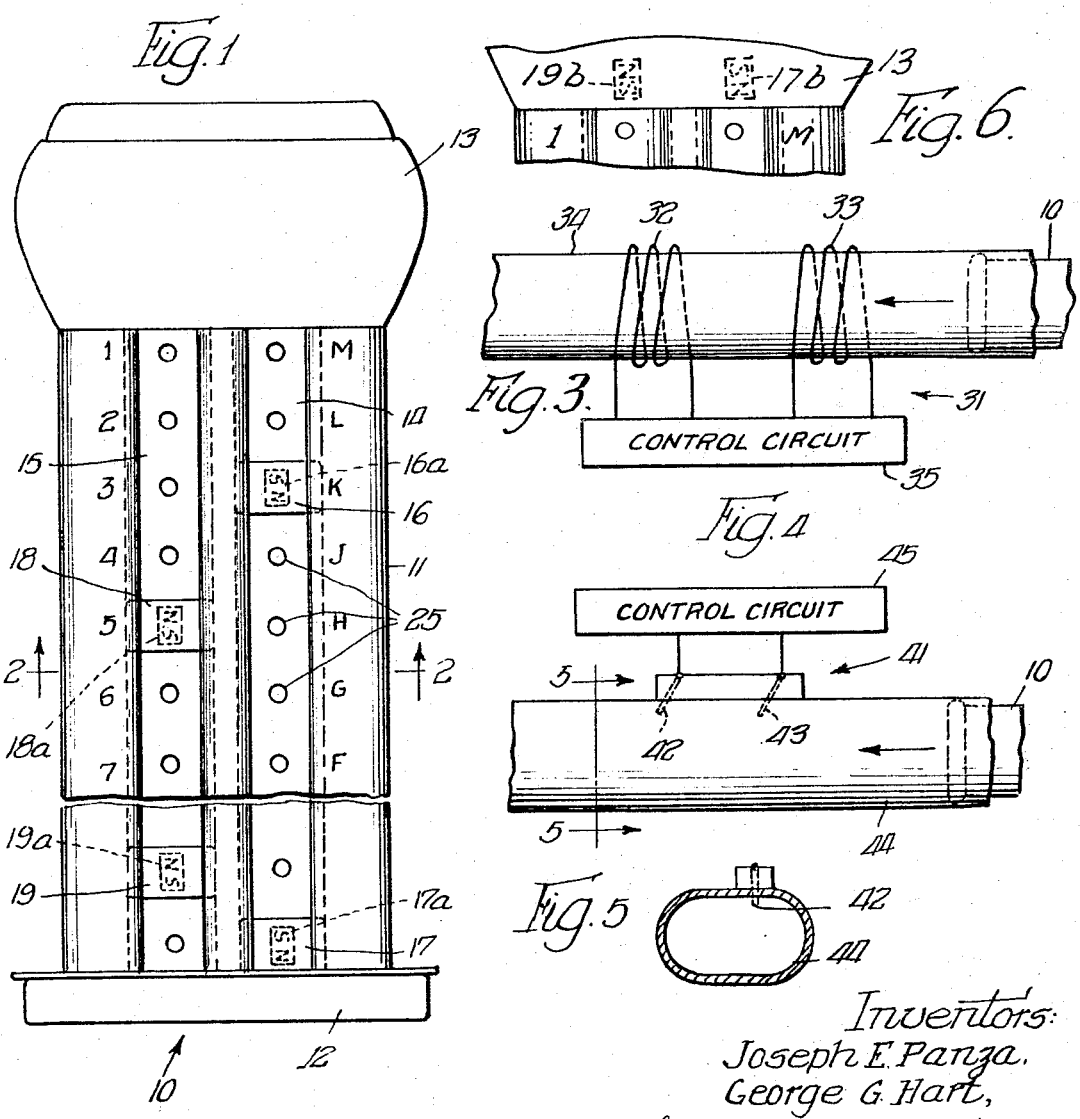
Inventors:
Joseph E. Panza,
George G. Hart,
By Hume, Groen, Clement & Hume
attys.

United States Patent Office 3,318,552
Patented May 9, 1967

3,318,552
PNEUMATIC CARRIER
Joseph E. Panza, Birmingham, and George G. Hart, Wayne, Mich., assignors to The Grover Company, Detroit, Mich., a corporation of Michigan
Filed Feb. 28, 1966, Ser. No. 530,558
9 Claims. (Cl. 243—32)

This invention relates to carriers and in particular, to a carrier for use in conveyor systems or pneumatic tube systems which is characterized by a capability for storing address information in a manner such that the address information may be read out by either electrical sensing means or magnetic sensing means.

In many pneumatic systems, the destination address information is preset by selective adjustment of means disposed on the carrier itself. As the carrier travels through the pneumatic tube system, suitable path-defining instrumentalities such as switch-wyes are selectively rendered effective by means sensing the address information preset in the carrier to direct the carrier to the desired destination. In this connection, the pneumatic tube system may comprise a single loop serving a number of destination stations in which event the carrier normally need only provide station address information. In more complex installations, the pneumatic tube system may comprise a plurality of loops each provided with a number of destination stations in which event the carrier normally provides both loop address information and station address information.

In conventional pneumatic tube systems of the type referred to in the preceding paragraph, the address sensing devices may comprise magnetic sensing means or electrical sensing means. By way of example, the magnetic sensing devices may comprise a pair of sensing coils disposed about the pneumatic tube and spaced a predetermined distance apart. In pneumatic tube systems using such magnetic sensing devices, the carrier is generally provided with at least one pair of magnets which are selectively spaced from one another to define the address information. Accordingly, when the carrier passes a pair of magnetic sensing coils which are spaced the same distance apart as the magnets located on the carrier, simultaneous voltage signals are induced in each of the sensing coils, and the occurrence of these simultaneous voltage signals causes a control system to actuate a path-defining instrumentality. In pneumatic tube systems which use electrical address sensing devices, the carrier is normally provided with a plurality of electrical contact rings spaced longitudinally along the body of the carrier. The address information is preset in the carrier by electrically connecting two of the spaced contact rings. As the carrier passes through the pneumatic tube system, it passes electrical sensing devices which comprise a pair of electrical contactors or brushes spaced a predetermined distance apart. When the carrier passes a particular electrical sensing device in which the brush contacts are spaced the same distance apart as the electrically connected contact rings on the carrier, an electrical circuit closure is effected causing a control circuit to actuate a path-defining instrumentality. It is significant that a particular conventional pneumatic tube system may make use of magnetic address sensing devices or, in the alternative, electrical address sensing devices, but not both, and that conventional carriers are likewise suitable for use with magnetic address sensing devices or, in the alternative, electrical address sensing devices, but not both.

It is a primary object of the present invention to provide a carrier which is suitable for use in pneumatic tube systems employing magnetic address sensing devices or in pneumatic tube systems employing electrical address sensing devices.

It is a further object of the present invention to provide a pneumatic tube system carrier in which the same adjustment presetting the destination address information into the carrier renders this address information readable by either magnetic address sensing devices or electrical address sensing devices.

It is an additional object of the present invention to provide a pneumatic tube system carrier which enables the use of both magnetic address sensing devices and electrical address sensing devices in a single pneumatic tube system.

It is still another object of the present invention to provide a pneumatic carrier usable with both magnetic address sensing devices and electrical address sensing devices and which is characterized by relatively low cost of manufacture and simplicity of construction, as well as versatility and reliability in operation.

Briefly described, a carrier in accordance with the present invention comprises a tubular body portion substantially of electrically non-conductive and non-ferromagnetic material with at least one longitudinal track in the periphery of the tubular body portion. A longitudinally continuous electrically conductive element is disposed along the slot. A pair of non-ferromagnetic members are engaged in the slot, and a signaling magnet is carried in each of these members. At least a portion of each of the members referred to is electrically conductive and arranged such that each of the members presents an exposed electrically conductive contacting surface which is in electrical connection with the longitudinal electrically conductive element. At least one of the members is slidably positionable along the slot so that the address-defining-spacing between the two members may be preset. Accordingly, as the carrier passes through the pneumatic tube system, the selected spacing between the two members can be sensed either by electrical sensing means including a pair of compatibly-spaced electrical contactors or by magnetic sensing means including a pair of compatibly-spaced magnetic sensing coils.

These and other features and objects of the present invention will be better understood by reference to the following detailed description taken together with the accompanying drawings. In the drawings:

FIGURE 1 is a side view in elevation of one form of carrier in accordance with the present invention.

FIGURE 2 is an enlarged cross-sectional view taken at 2—2 of FIGURE 1.

FIGURE 3 is an illustration, partly in elevation and partly diagrammatic, of a magnetic type address sensing device.

FIGURE 4 is an illustration, partly in elevation and partly diagrammatic, of an electrical type address sensing device.

FIGURE 5 is a cross-sectional view taken at 5—5 of FIGURE 4.

FIGURE 6 is a broken away view of a portion of the carrier of FIGURE 1 modified to contain stationary reference magnets not located in sleds.

Referring now in particular to FIGURES 1 and 2, it is seen that the carrier 10 depicted therein includes a main tubular body portion 11, a conventional forward end portion 12, and a conventional rearward end portion 13. The main body portion 11 is tubular and is formed of electrically non-conductive and non-ferromagnetic material such as plastic. For a purpose which will be described further on, the cross-sectional configuration of the tubular body portion 11 is preferably non-circular, as shown in FIGURE 2. A pair of laterally spaced longitudinal tracks 14 and 15 in the form of slots are provided in the periphery of the tubular body portion 11 and preferably extend the entire length of the tubular body portion 11. It will be apparent that the tubular body portion may be fabricated by extrusion so as to provide and define the tracks or slots 14 and 15 as the tubular body portion is being formed.

Engaged in each of the slots 14 and 15 are a pair of members commonly called sleds. For the purpose of explanation, the sleds in the slot 14 are identified by reference numerals 16 and 17, while the sleds engaged in the slot 15 are identified by reference numerals 18 and 19. It should be noted by reference to FIGURE 2 that the slots 14 and 15 are each formed to include an enlarged interior region so as to provide a pair of opposed flanges 21 which define the exterior opening to the slots 14 and 15. The sleds 16 through 19 are compatibly shaped to the cross-sectional configuration of the slots 14 and 15. Each of the sleds 16 through 19 includes a side runner 22 on each side which fits within one of the side recesses 23 in the slots 14 and 15. Each of the recesses 23 may be viewed as being defined by the portion of the inner wall of the slot which extends from the tip of the associated flange 21 to and including a co-extensive portion of the floor of the particular slot. A longitudinally continuous electrically conductive insert or connecting element 24 is disposed within each of the recesses 23 between the associated side runners 22 of the sleds in the particular slot and the side wall of the recess 23 itself. There are preferably two such connecting elements 24 in each of the slots 14 and 15. The connecting elements may be formed of copper or other highly electrically conductive but non-ferromagnetic material.

The sleds 16 through 19 are also formed of electrically conductive non-ferromagnetic material such as copper, brass, aluminum, or the like. Encased within each of these sleds 16 through 19 is a magnetic signalling element such as a permanent bar magnet arranged to induce voltage signals in magnetic sensing coils disposed along the pneumatic tube system. By way of illustration, the magnets encased within the respective sleds 16 through 19 are identified by reference numerals 16a, 17a, 18a, and 19a. The magnets 16a and 17a, encased within the respective members 16 and 17 in the slot 14 are preferably polarized in one direction as illustrated, while the magnets 18a and 19a encased in the members 18 and 19 in the slot 15 are preferably polarized in an opposite direction so that the voltage signals induced by the magnets associated with the slot 14 can be distinguished by the magnetic address sensing device from voltage signals induced by the magnets associated with the slot 15. Each of the members 16 through 19 is also preferably provided with a spherical indent which is adapted to register with respective ones of the plurality of spring-loaded ball dentent assemblies 25 spaced along the respective slots 14 and 15. In this manner, at least one of these sleds in a particular slot 14 or 15 may be selectively positioned at a point along the slot, thereby providing a preselected spacing between the sled so positioned and the other sled in the slot. It should also be noted that by using the spring-loaded ball-type detent assemblies 25, electrical contact between the sleds 16 through 19 and the electrically conductive elements 24 is insured.

Suitable address indicia will normally be provided on the periphery of the tubular body portion 11 along the sides of each of the slots 14 and 15, as depicted in FIGURE 1. In use of the carrier, one of the sleds in each of the slots 14 and 15 will normally be considered a stationary sled which would not ordinarily be moved in the process of presetting the address information into the carrier. By way of example, in FIGURE 1, the sled 17 in slot 14 may be considered a stationary sled, and sled 19 in the slot 15 may be considered a stationary sled. When two slots are provided in the carrier, as in FIGURES 1 and 2, one of these slots may be used for presetting loop address information and the other slot may be used for setting station address information. As previously mentioned, in each of the slots 14 and 15, the address information is preset by adjusting the slidably positionable sled 16, or 18, as the case may be, to provide a selected spacing between the slidably positionable sled. The spacing defines the address.

Referring now to FIGURE 3, there is shown a diagrammatic illustration of a magnetic address sensing device comprising a pair of sensing coils 32 and 33 each wrapped about the pneumatic tube 34. The sensing coils 32 and 33 are spaced a predetermined distance apart corresponding to the particular address to be sensed. The coils 32 and 33 are each connected to a control circuit 35 which is adapted to respond to the simultaneous inducement of a voltage signal in both of the coils 32 and 33 to actuate a path-defining instrumentality. A suitable control circuit for this purpose is disclosed in the co-pending application of William F. Joy, Ser. No. 513,633 filed Nov. 5, 1965. By way of illustration, the carrier is shown in FIGURE 3 approaching the sensing coils 32 and 33 of the magnetic address sensing means 31. Assuming that the control circuit 35 is conditioned to respond to voltage signals of the polarity of the magnets, for example, in the slot 14, simultaneous voltage signals will be induced in the voltage coils 32 and 33 to actuate the control circuit 35 if the sleds 16 and 17 in the slot 14 are spaced the same distance apart as the coils 32 and 33.

Referring now to FIGURE 4, an electrical address sensing means 41 is diagrammatically illustrated. The sensing means 41 comprises a pair of conventional brush contactors 42 and 43 spaced a predetermined distance apart along the pneumatic tube 44 corresponding to the particular address associated with sensing means 41. The brush contactors 42 and 43 are connected to a control circuit 45. For more detailed information regarding a suitable control system for use in an electrical address sensing means, reference is again made to the co-pending application of William F. Joy referred to above. In FIGURE 4, the carrier 10 is illustrated approaching the contact brushes 42 and 43. By using a non-circular carrier and pneumatic tube configuration, the brushes 42 and 43 may be positioned as illustrated in FIGURE 5 on the pneumatic tube 44 so as to wipe across the sleds 16 and 17 in the slot 14 as the carrier 10 passes by. A closed circuit condition will be thereby effected to actuate the control circuit 45 if the sleds 18 and 19 are spaced the same distance apart as the brush contactors 42 and 43. The control circuit 45 responds to such closed circuit condition to actuate a suitable path-defining instrumentality. A second set of brush contactors may be positioned on the pneumatic tube 44 to read the slot 15.

From the foregoing description, it is seen that a carrier according to the present invention, such as the carrier depicted in FIGURES 1 and 2, may be used in a pneumatic system employing magnetic address sensing means of the type indicated in FIGURE 3 or in a pneumatic tube system employing electrical address sensing means of the type indicated in FIGURE 4. It is significant, also, that the carrier of the present invention makes possible the use of both magnetic address sensing means and electrical address sensing means in the same pneumatic tube system.

While a certain specific embodiment of the invention has been illustrated and described, it is to be understood that this is merely by way of example and in no manner is to be construed as a limitation. It will be apparent to those skilled in the art that modifications may be made within the scope of the claims without departing from the spirit of the invention.

For example, the reference or stationary sleds 17 and 19 may be permanently wedged or otherwise rigidly mounted in position instead of being held in position by a spring-loaded ball detent. Also, a detent arrangement of the type shown in the co-pending application of George S. Ellery and Adam P. Weissmuller, Ser. No. 436,463, filed Mar. 2, 1965, issued on Nov. 29, 1966, as Patent No.

3,288,394, might be used in lieu of the ball-type detent arrangement disclosed herein.

As another modification, the stationary or reference magnets need not necessarily be located in the sleds 17 or 19, as shown in FIGURE 1, but may be encased within the forward or rearward portions of the carrier 12 and 13, respectively. This latter modification is depicted in FIGURE 6 in which reference magnets 17b and 19b are depicted as being secured in the rearward portion 13 of the carrier. In such circumstances, the stationary or reference electrical contacting surfaces 17 and 19 need not be in the form of a sled but rather may be a permanently positioned surface of electrically conductive material electrically connected to its associated longitudinal electrically conductive elements 24.

Another suitable modification would be to form a portion of each of the sleds 16 through 19 of electrically non-conductive and non-ferromagnetic material provided that each of the sleds as another portion includes an exposed contacting surface of electrically conductive non-ferromagnetic material which is arranged so that it would be at all times in electrical connection with the elements 24 in its associated track and would be contacted by properly positioned sensing brushes when passing through the pneumatic tube system.

Still another possibility is to make use of a single track for providing both loop and station addresses. This might be accomplished with reference to the track 14, for example, by not including a reference magnet 17a in the sled 17 but instead using a magnet 17b in the rearward portion 13 as the reference magnet. With this arrangement, the loop address, for example, may be set by the spacing between the magnets 16a and 17b while the station address may be set by the spacing between the sled 16 and the sled 17, both of the sleds 16 and 17 normally being moved in making the dual address setting. The loop address would be read by magnetic sensing means and the station address would be read by electrical sensing means.

The essential condition of the invention in all cases is that there be (1) at least one movable sled or member which has both a signaling magnet and a brush contacting surface in electrical connection with an electrically conductive connecting element extending along its associated track, (2) at least one reference brush contacting surface also in electrical connection with the connecting element, and (3) a reference magnet.

What we claim is:

1. In a carrier for use in a pneumatic tube, the combination comprising: a tubular body portion substantially of electrically non-conductive and non-ferromagnetic material, the periphery of said tubular body portion including at least one longitudinal track; at least one continuous electrically conductive element disposed along said track; and a pair of non-ferromagnetic members engaged in said track, each of said members carrying a signaling magnet, at least a portion of each of said members being electrically conductive and arranged such that each of said members presents an exposed, electrically conductive contacting surface electrically connected to said continuous element, at least one of said pair of members being selectively positionable along said track such that as said carrier passes through said pneumatic tube the spacing between said pair of members can be read either by electrical sensing means including a pair of compatibly-spaced electrical contactors or by magnetic sensing means including a pair of compatibly-spaced magnet sensing coils.

2. The carrier combination defined in claim in the combination with said pneumatic tube, said pneumatic tube and said carrier tubular body portion being of compatible non-circular cross-sectional configuration such that said carrier is adapted to maintain a preselected orientation relative to said pneumatic tube when traveling in said pneumatic tube.

3. The combination defined in claim 2 further comprising said electrical sensing means including said pair of compatibly-spaced electrical contactors, said pair of electrical contactors being positioned on said pneumatic tube so as to wipe across both of said members as said carrier passes through said pneumatic tube.

4. The combination defined in claim 2 further comprising said magnetic sensing means including said pair of compatibly-spaced magnet sensing coils.

5. The combination defined in claim 1 wherein said track comprises a slot in the periphery of said tubular body portion.

6. The combination defined in claim 5 wherein each of said non-ferromagnetic members is formed of electrically conductive material.

7. The combination defined in claim 6 wherein said continuous element is disposed within the interior of said slot and a surface portion of each of said members is urged into electrical contact with said electrically conductive element.

8. The combination defined in claim 7 further comprising a plurality of spring-loaded detent means for maintaining said slidably positionable member in a selection position along said track and for urging said surface portion of said slidably positionable member into electrical contact with said electrically conductive element.

9. In a carrier for use in pneumatic tube systems, the combination comprising: a tubular body portion substantially of electrically non-conductive and non-ferromagnetic material, the periphery of said tubular body portion including at least one longitudinal track; at least one continuous electrically conductive element disposed along said track and extending substantially the length of said track; at least one member of non-ferromagnetic material slidably engaged in said track, said member carrying first magnetic signaling means, at least a portion of said member being electrically conductive and arranged such that said member presents a first exposed, electrically conductive contacting surface electrically connected to said continuous element; second magnetic signaling means; and a second exposed, electrically conductive contacting surface electrically connected to said continuous element, whereby as said carrier passes through said pneumatic tube system the longitudinal spacing between said member and said second magnetic signaling means can be read by magnetic sensing means including a pair of compatibly-spaced magnet sensing coils and the longitudinal spacing between said member and said second electrically conductive contacting surface can be read by electrical sensing means including a pair of compatibly-spaced electrical contactors.

References Cited by the Examiner

UNITED STATES PATENTS

| | | | |
|---|---|---|---|
| 2,773,658 | 12/1956 | Uan Oheren | 243—16 |
| 2,888,218 | 5/1959 | Kuhn | 243—16 |
| 2,970,791 | 2/1961 | Hafner | 243—16 |
| 3,054,576 | 9/1962 | Hennessy | 243—39 |

EVON C. BLUNK, *Primary Examiner.*

H. C. HORNSBY, *Assistant Examiner.*

UNITED STATES PATENT OFFICE
CERTIFICATE OF CORRECTION

Patent No. 3,318,552                                                                May 9, 1967

Joseph E. Panza et al.

It is hereby certified that error appears in the above numbered patent requiring correction and that the said Letters Patent should read as corrected below.

Column 3, line 26, for "prefrably" read -- preferably --; line 52, for "dentent" read -- detent --; column 4, line 5, after "sled" insert -- and the stationary sled --; column 6, line 1, after "claim" insert -- 1 --; same line 1, strike out "the"; line 62, for "Uan Oheren" read -- Van Otteren et al --.

Signed and sealed this 21st day of November 1967.

(SEAL)
Attest:

Edward M. Fletcher, Jr.                                      EDWARD J. BRENNER

Attesting Officer                                                   Commissioner of Patents